United States Patent [19]
Gurwicz et al.

[11] 3,760,246
[45] Sept. 18, 1973

[54] RELATIVE SPEED CONTROL SYSTEM FOR DC MOTOR VEHICLE DRIVE

[75] Inventors: David Gurwicz, Gateshead; Edwin Amitage Battye, Lymm; James Wright, Winwick, all of England

[73] Assignees: Conveyancer Limited, Warrington; Sevcon Engineering Limited, Durham, England

[22] Filed: June 28, 1971

[21] Appl. No.: 157,416

Related U.S. Application Data
[63] Continuation-in-part of Ser. No. 13,151, Feb. 20, 1970.

[30] Foreign Application Priority Data
Feb. 25, 1969  Great Britain .................. 10,019/69

[52] U.S. Cl. .................................... 318/52, 318/99
[51] Int. Cl. ............................................. H02p 5/46
[58] Field of Search ........................ 318/52, 98–100

[56] References Cited
UNITED STATES PATENTS

| | | | |
|---|---|---|---|
| 2,773,227 | 12/1956 | Lillquist .............................. | 318/52 |
| 3,596,154 | 7/1971 | Gurwicz et al ...................... | 318/52 |
| 3,534,239 | 10/1970 | Risberg .............................. | 318/52 |
| 2,930,957 | 3/1960 | Cronberger ........................ | 318/52 |

*Primary Examiner*—Gene Z. Rubinson
*Attorney*—William J. Daniel

[57] ABSTRACT

A control system for two DC motors driving the driving wheels of an electric vehicle. Sensing means detect a differential speed between the two motors and act to remove the voltage to the faster motor, to eliminate the speed differential, and simultaneously reduce the voltage to the other motor. Override means are preferably provided to enable the system to be bypassed when the vehicle is turning to allow the outer wheel to revolve faster than the inner wheel.

9 Claims, 1 Drawing Figure

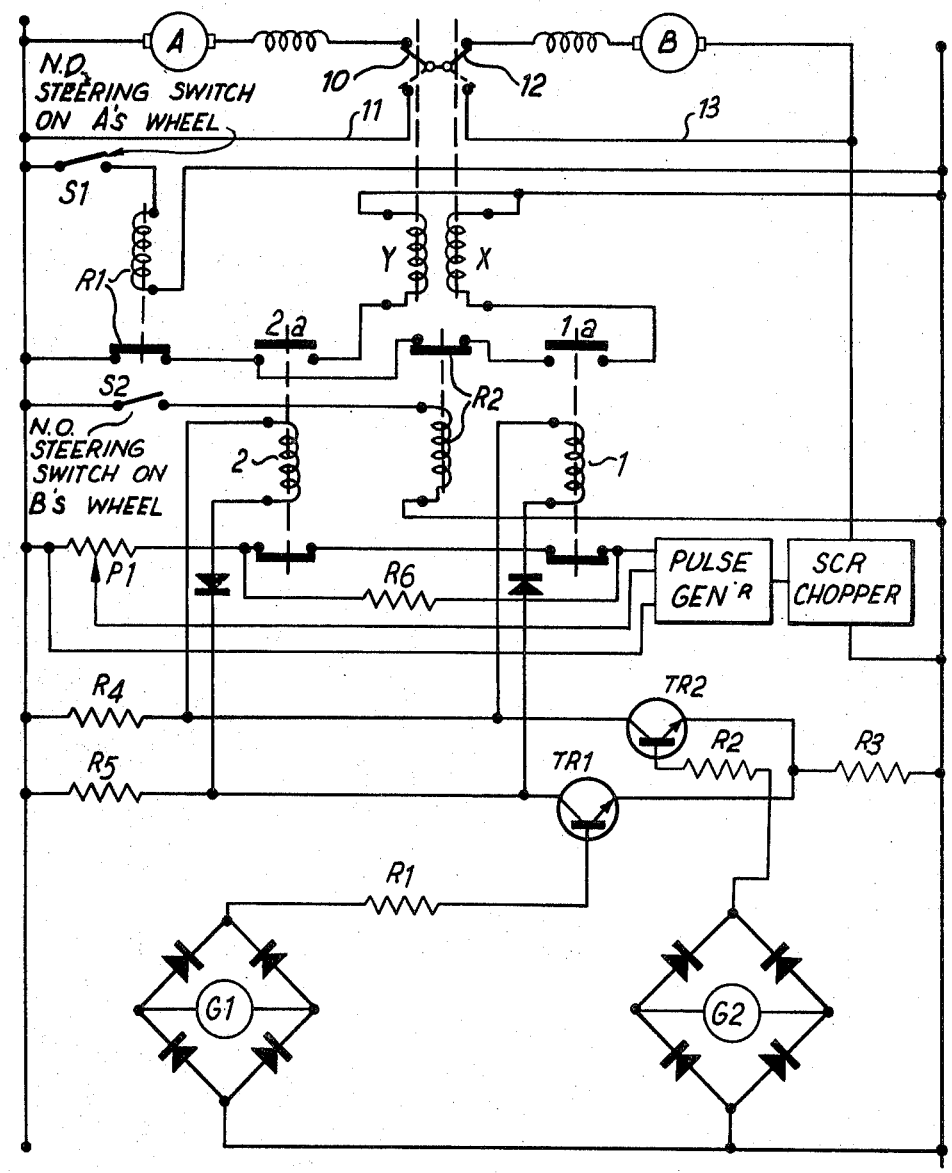

RELATIVE SPEED CONTROL SYSTEM FOR DC MOTOR VEHICLE DRIVE

This application is a Continuation-in-Part of application for U.S. Pat. Ser. No. 13151, and now abandoned, entitled A Control System for Direct Current Electric Motors and filed by the same applicants.

This invention relates to the control of two or more direct current electric motors having at least their armatures connected in series and driven from a common power source and is particularly, though not exclusively, concerned with the control of two such motors adapted to drive the driving wheels of an electrically driven vehicle.

A dual motor drive for such a vehicle can be provided by connecting two motors in parallel across the supply but such an arrangement suffers from the disadvantage that if one motor revolves faster than the other, resultant unbalanced currents in the motors could, in certain conditions, be heavy with consequent damage to the motors or their control circuits.

By connecting two such motors in series, a differential system can be achieved so that no detrimental effect on the motors results from the above mentioned conditions. However, this arrangement suffers from the disadvantage that, as in a mechanical equivalent differential systems, if adhesion of one wheel with the ground is lost then all the power is directed to driving that wheel which thus spins freely and drive to the vehicle is lost.

A system has been proposed which uses motors connected in series for starting and which are switched to parallel connection for normal running but this system can be complex and offers no particular advantage against the recent use of semi-conductors.

The object of the present invention is to provide a control system for two or more direct current electric motors having at least their armatures connected in series, wherein the disadvantages mentioned above are obviated or at least reduced.

According to the present invention there is provided a control system for two direct current electric motors having at least their armatures connected in series, comprising sensing means adapted to detect the occurence of an excessive speed differential between said motors, means for removing the voltage applied to the faster motor to eliminate the excessive speed differential, voltage reducing means being provided for reducing the effective voltage applied to the other motor to a safe value.

The invention will now be described, by way of example only, with reference to one practical form thereof as illustrated in the accompanying circuit diagram.

The following description relates to the control of electric dual drive vehicles, where each of the driving wheels is driven from a separate motor, but it is to be appreciated that the system can be used to control two or more motors adapted for any use.

A control system, adapted to control two series wound D.C. electric motors connected in series will be described where the supply voltage is E volts.

As the motors are in series, then at all times the load current in the motors will be equal, e.g., I amps. If the vehicle is moving in a straight path and both road wheels are revolving at the same speed, then assuming the motors to be identical in characteristics, the applied voltage to each motor will be $E/2$ volts. Also the back e.m.f., $Eb$ in each motor is equal to the applied voltage $E/2$ less the ohmic drop in the motor which is the current value multiplied by the motor resistance;

thus $E/2 = Eb + I \times Rm$, where $I$ is the load current and $Rm$ is the motor resistance.

If the steering wheels of the vehicle are turned to full lock, each driving wheel will take its own path and thus one wheel will turn at a slower speed than the other. As the back e.m.f. of a D.C. motor is proportional to its speed, the back e.m.f. of the slower motor will reduce so that the current will try to rise. However, as the torque remains approximately unchanged, the current I drawn from the supply will not increase.

At all times the sum of the voltages across the motors must equal the supply voltage E. As can be seen from the above equation, if the back e.m.f. of one motor is reduced, due to the reduction in speed, then so is the voltage across that motor. Therefore the voltage across the other motor is increased so that the latter is driven at a faster speed. Hence the differential action referred to above is achieved.

If, due to an uneven surface, one wheel leaves the ground and the load is thus removed from its motor, the load current is reduced. The speed is inversely proportional to the load current and thus under these conditions the speed of the motor will increase together with the back e.m.f. With an increase in the back e.m.f., the voltage across the motor will increase and thus that across the other motor will be reduced so that the other wheel loses its drive and its motor merely acts as a resistance in circuit with the spinning motor. Therefore a reduced current will flow and there will be insufficient torque to drive the truck. Thus a stalled vehicle condition exists.

In order to overcome this difficulty, a control system is provided in accordance with the invention as shown in the drawing.

The circuit illustrates two series wound motors A and B connected in series. If the wheel driven by motor A leaves the ground then this motor will tend to speed up leading to a stalled condition of motor B. However, speed sensing device is associated with both motors A and B and is adapted to sense at all times the speed differential between the two motors. This speed sensing device comprises two tacho-generators G1 and G2. Respectively connected to the armatures of the motors B and A. The output of these is bridge rectified so that the potential appearing at the bases of two transistors TR1 and TR2 is always positive, independent of the direction of rotation. Transistors TR1 and TR2 form an emitter coupled differential amplifier. Connected between the collectors of these two transistors are two relays each in series with a diode, the diodes being poled opposite to each other. If the outputs of the two generators are equal, both transistors will conduct equally and the voltage difference between the collector of TR1 will be equal to that of the voltage difference at the collector of TR2. Thus as the speed of motor A increases in relation to that of motor B which will tend to stall, the output from the tacho-generator G2 increases over that of G1, transistor TR2 is conducted to a greater degree than transistor TR1 and its collector is more negative than the collector of TR1. When the potential difference between these two collectors is great enough to energise Relay 2, this will close and cut motor A out of circuit by switching the switch 10 over to the conductor 11. Relay 1 cannot close under these conditions due to the blocking effect of the diode. An exactly similar situation exists if, for example, the output of G1 were to increase over G2 due to an increase in the speed of motor B in relation to that of motor A.

Under these conditions, the full supply voltage E is placed across motor B with an undesirable effect. Therefore, an SCR chopper system being fed by a pulse generator, which determines the mark to space ratio of the chopper, is provided. The pulse generator receives its input signal from a potentiometer P.1. the wiper of which travels from maximum positive to maximum negative. The pulse generator is of known form. The system is arranged that with the wiper at maximum positive the output from the chopper is virtually zero, and with the wiper at maximum negative full voltage is applied to the two motors. In series with the potentiometer is connected a resistor R1 whose value ohmically is equal to the resistance value of the potentiometer P.1. Under normal operation this resistor is short circuited by normally closed contacts associated with Relays 1 or 2. If for any reason either of these relays is energised, the excursion of the wiper below the positive line is immediately halved and thereby the output of the SCR chopper. Therefore at the instant the contacts 2a of relay 2 close, the pulse rate to motor B is reduced automatically so that the effective voltage across the latter is reduced to approximately $E/2$. Motor B can therefore drive the vehicle beyond the obstacle which caused motor A to run away. Whilst this is happening the motor A slows down because the power supply has been cut off from it and consequently the differential speed between the motors reduces so that the signal from the sensor is lost allowing the contacts 2a of relay 2 to re-open, returning the system to normal. If this occurs too rapidly, i.e., before the wheel driven by the motor A has regained adhesion motor A will run away again and the cycle repeats. This can lead to undesirable frequency of operation — and consequently wear of the contacts 2a so it is desirable that the sensor should have a wide differential which may be adjustable and/or a time delay should be imposed on the opening of contacts 2a following their closure in consequence of a signal from the sensor. This delay may be imposed by a timing device which is activated on detection of the excessive speed differential. Alternatively the timing device could be activated when the speed differential reduces, falls to zero or reverses. The duration of the delay should be sufficient to ensure that undesirable frequency of operation of the contacts 2a does not occur.

The circuit for both motors is identical and the reverse action takes place should the wheel driven by motor B leave the ground, i.e., the contacts 1a of relay 1 close and energise contactor X to activate switch 12. Thus current by-passes motor B via conductor 13.

The speed sensing device can comprise a tachogenerator attached to each armature or a relay responsive to each armature voltage or any other device adapted to sense a difference in speed between the two motors.

It has to be considered that when the vehicle is turning in a tight circle, the inner driving wheel will rotate at a greatly reduced speed relative to the outer wheel if it is not in fact completely stationary. Therefore, the sensing device would normally detect a large speed differential and would operate to cut out the faster moving motor so that the vehicle would tend to stall. An overide device is therefore provided which comprises microswitches operated by respective cams on each driving wheel. These switches are referenced $S_1$ and $S_2$ on the drawing. When one of the driving wheels is turned through a certain predetermined angle in a given direction the switch for that wheel is operated. The switches are associated with respective relays $R_1$, $R_2$ and the associated relay opens its contacts. The relay contacts are disposed in series with the relay contacts for switching in the bypass circuit for the associated motors. Thus, to take a specific case, with the vehicle turning a tight circle the inner driving wheel B will rotate at a greatly reduced speed and the sensing device would normally operate to cut out the driving motor for wheel A. When wheel A has turned through the predetermined angle, however, switch $S_1$ closes and $R_1$ opens its contacts. Therefore closure of contacts 2a cannot cause the motor for wheel A to be by-passed. Alternatively the over-ride device can be adapted to reverse the operation of the sensing device so that, under these conditions, the latter causes the motor driving the inner wheel to be open or short circuited. Indeed the over-ride device can be adapted to cause reverse rotation of the motor driving the inner wheel so as to assist the vehicle to turn in a tight circle. Furthermore, this action can be provided in two stages so that the inner wheel is stopped for a fairly tight turning circle and reversed for full lock.

The back e.m.f. of a run-away motor may be reduced by short circuiting the motor in question. The same result can be achieved however, as in the circuit shown, by open-circuiting the run-away motor and providing an alternative path for the current to the other motor or by open-circuiting or short-circuiting the armature or the field alone of the run-away motor.

Also the switching of a motor can be effected by means other than the contactors, for example, by using a solid state electronic system having semi-conductors to by-pass the armature of one motor.

A steering action for the vehicle could be achieved by selectively reducing the driving effect of one of the motors by any of the methods heretofore described, e.g., by momentarily short circuiting or by-passing one of the motor armatures to reduce its speed whilst the other continues to move to a fixed speed.

Although the invention has been described as a system for controlling the operation of series wound, series connected D.C. motors, it can equally well be applied to shunt wound or compound wound motors having their armatures connected in series.

We claim:

1. A control system for two direct current electric motors having at least their armatures connected in series, comprising sensing means adapted to detect the occurence of an excessive speed differential between said motors, means for removing the voltage applied to the faster motor to eliminate the excessive speed differential, voltage reducing means being provided for reducing the effective voltage applied to the other motor to a safe value.

2. A control system according to claim 1, in which means are provided and adapted, upon sensing of said speed differential, to open-circuit the armature of said faster-running motor and to provide an alternative current path to the other motor, whereby the back e.m.f. of the faster-running motor is reduced.

3. A control circuit according to claim 2, in which said means comprises, in each armature circuit a two position switch controlled by a relay, actuation of the relay causing a change in position of the switch to open circuit the armature and complete the alternative current path.

4. A control system according to claim 1 in which said voltage reducing means comprises an electronic system utilizing semi-conductors and said electronic system comprises an SCR chopper fed by a pulse generator which determines the mark to space ratio of the chopper and the pulse generator being fed through a potentiometer in sines with a resistor which is normally short circuited, the short circuit being removed when the voltage is removed from either motor thereby to reduce the input voltage to the pulse generator and the output of the SCR chopper.

5. A control system according to claim 1 in which means are provided to prevent an undesirable frequency of operation of the system.

6. A control system according to claim 1, in which said sensing means includes a tacho-generator attached to each armature.

7. A control system as in claim 1 wherein said two direct current electric motors are operative to drive the driving wheels of an electric vehicle, and including override means adapted to deactivate the control system when the vehicle is turning in a tight circle to allow a speed differential between the wheels for turning purposes, said override means comprising microswitches operated by corresponding cams on each driving wheel when the corresponding wheel has turned through a certain predetermined angle, and relays controlled by the microswitches so that on actuation of a microswitch the corresponding relay acts to prevent removal of voltage applied to the faster motor.

8. A control system as in claim 1 wherein said two direct current electric motors are operative to drive the driving wheels of an electric vehicle, and including override means adapted to de-energise the control system when the vehicle is turning in a tight circle to allow a speed differential between the wheels for turning purposes, the override means comprising means for preventing removal of voltage of the faster running motor and means for open or short circuiting the slower running motor.

9. An electrically driven vehicle comprising at least two driving wheels, two electric motors respectively in driving connection with the two driving wheels, said electric motors having at least their armatures connected in series, and a control system for said motors comprising sensing means adapted to detect the occurrence of an excessive speed differential between said motors, means for removing the voltage applied to the faster motor to eliminate the excessive speed differential, and voltage reducing means for reducing the effective voltage to the other motor to a safe value.

* * * * *